United States Patent [19]
Tatebayashi et al.

[11] Patent Number: 6,009,174
[45] Date of Patent: Dec. 28, 1999

[54] SECRET KEY TRANSFER METHOD WHICH IS HIGHLY SECURE AND CAN RESTRICT THE DAMAGE CAUSED WHEN THE SECRET KEY IS LEAKED OR DECODED

[75] Inventors: Makoto Tatebayashi, Takarazuka; Motoji Ohmori, Osaka; Takehisa Kato, Yokohama; Naoki Endoh, Fuchu; Koichi Hirayama, Yokohama, all of Japan

[73] Assignee: Matsushita Electric Industrial Co., Ltd., Osaka-fu, Japan

[21] Appl. No.: 08/957,910

[22] Filed: Oct. 27, 1997

[30] Foreign Application Priority Data

Oct. 31, 1996 [JP] Japan .................................. 8-290374

[51] Int. Cl.$^6$ ............................. H04L 9/00; H04L 9/08; H04L 9/12; H04L 9/14
[52] U.S. Cl. ................................. 380/21; 380/43; 380/23
[58] Field of Search .................................. 380/1, 21, 43, 380/44, 46

[56] References Cited

U.S. PATENT DOCUMENTS

| | | | |
|---|---|---|---|
| 4,197,502 | 4/1980 | Sumner et al. | 375/75 |
| 4,440,976 | 4/1984 | Bocci et al. | 179/1.5 R |
| 4,771,458 | 9/1988 | Citta et al. | 380/20 |
| 4,802,215 | 1/1989 | Mason | 380/21 |

Primary Examiner—Tod R. Swann
Assistant Examiner—Stephen Kabakoff
Attorney, Agent, or Firm—Price, Gess & Ubell

[57] ABSTRACT

A transmission apparatus 100 includes a secret key storage unit 103 that stores three secret keys K1, K2 and K3, a secret key selection unit 104 that selects one secret key Ks from the secret keys, a message generation unit 106 for generating a message M used as a carrier for indicating a secret key, an encryption module 105 for generating a cryptogram Ca by encrypting the generated message M using the secret key Ks, an encryption module 107 for generating a cryptogram Cm by encrypting the message M using the message M itself as the secret key, and two transmission units 111 and 112 for transmitting the cryptograms Ca and Cm to the reception apparatus 200 to indicate the selected secret key Ks. The reception apparatus 200 includes a decryption module, such as 221, for generating decrypted data Mi by decrypting the cryptogram Ca using a secret key Ki out of the three secret keys, and a decryption module, such as 222, for generating decrypted data Mii by decrypting the cryptogram Cm using the decrypted data Mi, and authorizes that the secret key Ki has been selected when the decrypted data Mi matches the decrypted data Mii.

14 Claims, 7 Drawing Sheets

SECRET KEY TRANSFER METHOD WHICH IS HIGHLY SECURE AND CAN RESTRICT THE DAMAGE CAUSED WHEN THE SECRET KEY IS LEAKED OR DECODED

BACKGROUND OF THE INVENTION

1. Field of the Invention

The present invention relates to a transfer method for secret keys to be used in encrypted communication, and especially relates to a technique for specifying one out of a plurality of distributed secret keys that is to be used in encrypted communication.

2. Description of the Prior Art

In recent years, secret key encrypted communication systems have been developed which encrypt data for using a secret key and transmit the encrypted data using a transfer medium or record the encrypted data onto a recording medium for later reproduction. In such systems, the transmission apparatus and the reception apparatus respectively perform encryption and decryption using a shared secret key which has been provided to both apparatuses beforehand.

When both the transmission apparatus and the reception apparatus are provided with a plurality of secret keys, it is necessary to specify one of these secret keys before encrypted communication is commenced so that both apparatuses will use the correct key. This is performed to ensure that the reception apparatus will be able to decrypt the cryptograms transmitted by the transmission apparatus.

In conventional encrypted communication systems, however, should the secret key be obtained by an unauthorized third party, it will be necessary to replace the secret key with a new secret key in all of the communication devices which previously used this secret key. When the secret key is permanently stored in the components of the communication apparatuses, such as in a ROM (Read Only Memory), or when the secret key was used by a large number of communication apparatuses, this means that a great deal of work needs to be performed to establish the new key.

SUMMARY OF THE INVENTION

The present invention has been conceived in view of the stated problems and has a first object of providing a secret key transfer technique that prevents third parties from decoding the secret key, and allows secret key encrypted communication to be continued without having to provide a new secret key, even when one of the secret keys has been leaked or decoded.

The stated object can be achieved by a secret key transfer method that is used in a communication system composed of a transmission apparatus and a reception apparatus, where the transmission apparatus selects one secret key Ks out of a plurality of secret keys that are provided beforehand, and transfers an indication of the selected secret key Ks to the reception apparatus. The transmission apparatus includes a secret key storage unit that stores a plurality of secret keys K1–Kn, a secret key selecting unit that selects one out of the plurality of secret keys K1-Kn, a message generation unit that generates a message used as a carrier for transferring the secret key Ks, a first encrypting unit for generating a cryptogram Ca by encrypting the message using the selected secret key Ks, a second encrypting unit for generating a cryptogram Cm by encrypting the message using the message itself as the encryption key, and a transferring unit for transmitting the cryptograms Ca and Cm to the reception apparatus to transfer the secret key Ks. The reception apparatus includes a first decrypting unit for decrypting the cryptogram Ca using each secret key Ki successively selected out of the plurality of secret keys K1–Kn to generate the decrypted data Mi, a second decrypting unit for decrypting the cryptogram Cm using the decrypted data Mi as the decryption key to generate the decrypted data Mii, and a judging unit for judging whether the decrypted data Mi matches the decrypted data Mii. When the decrypted data Mi matches the decrypted data Mii for one of the secret keys Ki, the reception apparatus authorizes this secret key Ki as the secret key Ks transferred from the transmission apparatus.

The reception apparatus utilizes the predetermined rule for the cryptogram Cm, which is to say that the cryptogram Cm is generated by encrypting the plaintext M using the same plaintext M as the encryption key, as the basis for its judgement, and so is able to specify the secret key Ks and the message M transferred by the transmission apparatus.

Although secret key Ks selected by the transmission apparatus out of the secret keys K1–Kn is transmitted to the reception apparatus in a concealed state whereby it cannot be directly known, the reception apparatus still is able to specify the same secret key Ks, making the present secret key transfer technique safe from attempts by third parties to obtain the secret key.

The present secret key transfer technique is also such that should one of the secret keys be leaked or decoded, the transmission apparatus can be simply made to select a different secret key out of the plurality of secret keys, meaning the secret key encrypted communication can be continued without having to provide a new secret key to both apparatuses.

Here, before transmitting the cryptograms Ca and Cm, the transmission apparatus may investigate whether the cryptograms Ca and Cm are suitable cryptograms which ensure that the correct secret key Ks can be specified by the reception apparatus.

In more detail, the transmission apparatus may further include a first decrypting unit for generating decrypted data Ma by decrypting the cryptogram Ca using a secret key Kj selected one at a time from the secret keys which were not selected by the secret key selecting unit, a second encrypting control unit for having the second encrypting unit generate the cryptogram Cmm by encrypting the decrypted data Ma using the decrypted data Ma itself as the encryption key, and a gate unit and comparing unit for only allowing the transmission of the cryptograms Ca and Cm when the cryptogram Cmm does not match the cryptogram Cm for all of the secret keys Kj.

Alternatively, the transmission apparatus may further include a first decrypting unit for generating decrypted data Ma by decrypting the cryptogram Ca using a secret key Kj selected one at a time from the secret keys which were not selected by the secret key selecting unit, a second decrypting unit for generating decrypted data Mm by decrypting the cryptogram Cm using the decrypted data Ma as the decryption key, and a gate unit and comparing unit for only allowing the transmission of the cryptograms Ca and Cm when the decrypted data Ma does not match the decrypted data Mm for all of the secret keys Kj.

As a result, the problems that can occur due to the second encryption unit encrypting the message M with the same message M as the encryption key, which is to say the reception apparatus mistakenly authorizing a secret key Kj that differs from the secret key Ks selected by the transmission apparatus, can be avoided.

BRIEF DESCRIPTION OF THE INVENTION

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

First Embodiment

The following is a description of the first embodiment of the present invention with reference to the drawings.

This first embodiment is secret key encrypted communication system that uses the secret key transfer method of the present invention. It should be noted that in the present specification, the expression "secret key transfer" refers not to the transfer of the secret key itself, but to the transfer of information that indicates one out of a plurality of secret keys that are distributed in advance.

Construction of the Encrypted Communication System

Figure 1:
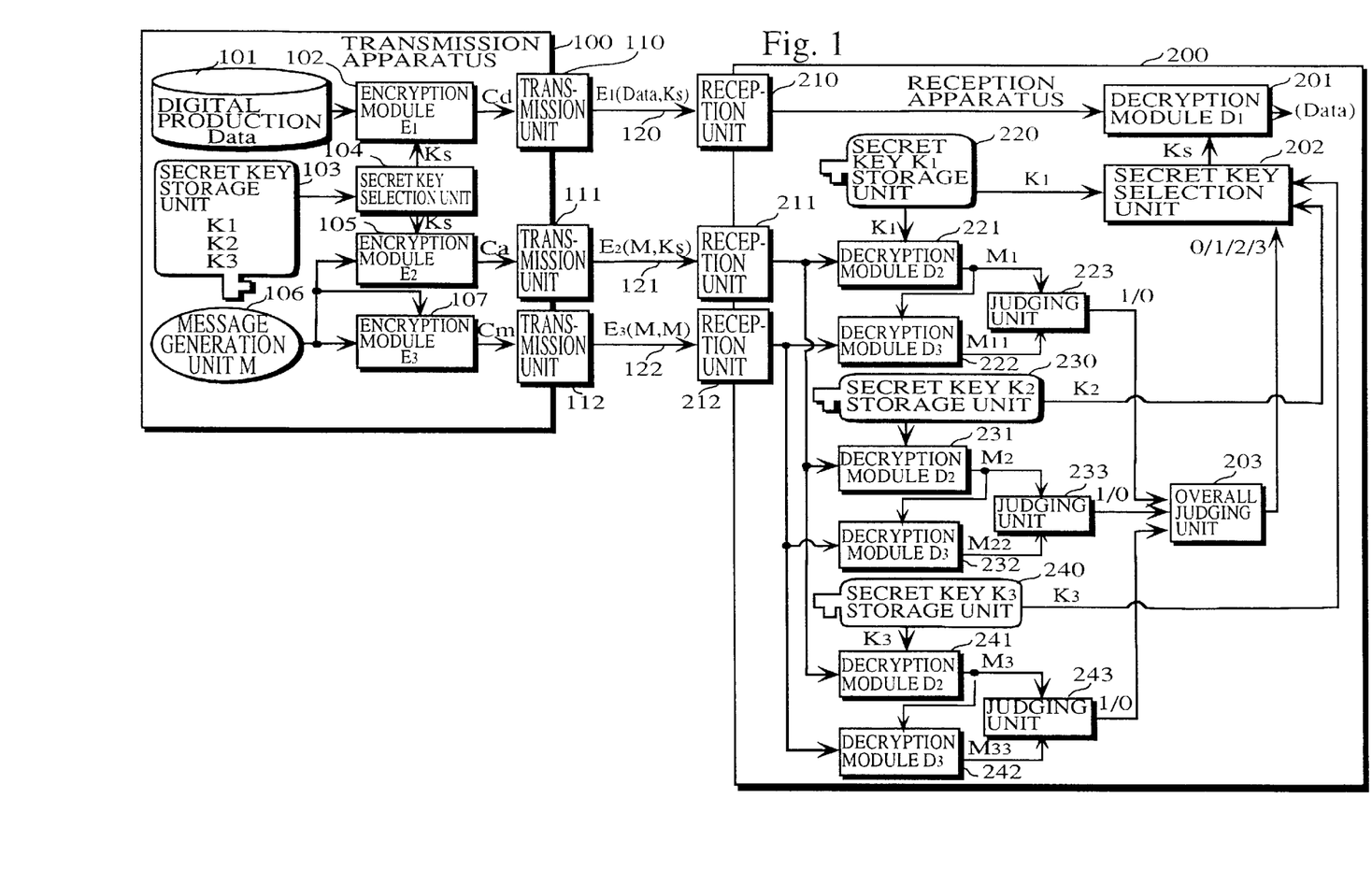
FIG. 1 is a block diagram showing the construction of the encrypted communication system of the first embodiment of the present invention.

FIG. 1 is a block diagram showing the construction of the encrypted communication system of the first embodiment. This system is composed of a transmission apparatus 100, a reception apparatus 200, and three transfer paths 120–122 which connect these apparatuses. In the present system, three secret keys K1, K2, and K3 are provided beforehand to the transmission apparatus 100 and to the reception apparatus 200, so that the transmission apparatus 100 can freely select one of these secret keys and use it to encrypt a digital production which it then transmits to the reception apparatus 200.

The transmission apparatus 100 can be realized using a personal computer that is capable of communication and a magnetic disc drive. In detail, the transmission apparatus 100 is composed of a digital production 101, a secret key storage unit 103, a secret key selection unit 104, three encryption modules 102, 105, and 107, a message generation unit 106, and three transmission units 110–112.

The transmission apparatus 100 has the final object of encrypting the stored digital production 101 and transferring it to the reception apparatus 200. To do so, the transmission apparatus 100 transmits two kinds of cryptograms to the reception apparatus 200, namely, the cryptogram Ca for secretly informing the reception apparatus 200 of the secret key used for encrypting the digital production and the cryptogram Cm for informing the reception apparatus of the predetermined rule used as the standard for specifying this secret key, in addition to the encrypted digital production Cd.

The digital production 101 can be realized by a hard disk drive, and stores data, such as a digitized text, audio, video, or a program.

The secret key storage unit 103 can be realized by a semiconductor memory which stores the three secret keys K1, K2, and K3.

The secret key selection unit 104 freely selects and reads one of the secret keys K1 to K3, which are stored in the secret key storage unit 103, as the secret key to be used to encrypt the digital production 101. The secret key selection unit 104 then sends this secret key to the encryption module 102 and the encryption module 105.

The encryption module 102 can be an integrated circuit (IC) that performs encryption based on a secret encryption algorithm E1. The encryption module 102 reads a one-block unit of the digital data "Data" from the digital production 101, encrypts the data using the secret key Ks sent from the secret key selection unit 104 as the encryption key, and transfers the obtained cryptogram Cd(=E1(Data,Ks)) to the transmission unit 110. The encryption module 102 repeats this processing for all of the data in the digital production 101.

Note here that the notation "E(M,K)" shows a cryptogram obtained by subjecting the plaintext M to the encryption algorithm E using the encryption key K. In the same way, the notation "D(C,K)" shows the decrypted data obtained by subjecting the cryptogram C to the decryption algorithm D using the decryption key K.

The message generation unit 106 can be realized by a random number generator that generates a random number and stores it as the message M. This message M is dummy data that is used as the carrier for informing the reproduction apparatus 200 of the secret key used for the encryption of the digital production 101. Accordingly, the content of this message M is not especially important.

The encryption module 105 can be an integrated circuit (IC) that performs encryption based on a secret encryption algorithm E2. The encryption module 105 reads the message M stored in the message generation unit 106, encrypts it using the secret key Ks sent from the secret key selection unit 104 as the encryption key, and transfers the obtained cryptogram Ca(=E2(M,Ks)) to the transmission unit 111.

The encryption module 107 can be an integrated circuit (IC) that performs encryption based on a secret encryption algorithm E3. The encryption module 107 reads the message M stored in the message generation unit 106, encrypts it using the message M itself as the encryption key, and transfers the obtained cryptogram Cm(=E3(M,M)) to the transmission unit 112.

The cryptograms Ca and Cm described here are used to indirectly inform the reception apparatus 200 of which of the secret keys K1, K2, and K3 has been selected by the secret key selection unit 104 as the secret key Ks.

The transmission units 110, 111, and 112 can each be composed of a parallel-to-series convertor and an amplifier, and are respectively used to transmit the cryptograms Cd, Ca, and Cm to the reception apparatus 200 via the transfer paths 120, 121, and 122.

The transfer paths 120–122 can be composed of communication cables or a recording medium.

The reception apparatus 200, meanwhile, is composed of seven decryption modules 201, 221, 222, 231, 232, 241, and 242, three secret key storage units 220, 230, and 240, three judging units 223, 233, and 243, an overall judging unit 203, a secret key selection unit 202, and three reception units 210–212.

This reproduction apparatus has a final object of decrypting and using the encrypted digital production Cd transmitted by the transmission apparatus 100. Here, the secret key to be used in the decryption, which is to say the secret key Ks which was selected by the secret key selection unit 104 in the transmission apparatus 100, is specified from the two kinds of cryptogram Ca and Cm that are transmitted with the encrypted digital production Cd.

The reception units 210, 211, and 212 can each be composed of a series-to-parallel convertor, and are respectively used to receive the three kinds of cryptogram Cd, Ca, and Cm from the transfer paths 120, 121, and 122.

The decryption module 201 can be composed of an IC for performing decryption based on the secret decryption algorithm D1 that is the inverse transformation of the encryption algorithm E1 of the encryption module 102 in the transmission apparatus 100. When given a secret key Ks by the secret key selection unit 202, the decryption module 201 uses the secret key to decrypt the cryptogram Cd sent from the reception unit 210, and by doing so restores the block data "Data" (=D1(Cd,Ks)) of the original digital production.

It should be noted here that the decryption module 201 only repeats its decryption while the encrypted digital production Cd is being repeatedly sent from the transmission apparatus 100. When it has not been given a secret key Ks by the secret key selection unit 202, the decryption module 201 judges that the specifying of the secret key has failed and so does not attempt to decrypt the encrypted digital production Cd.

The secret key storage unit 220, the decryption module 221, the decryption module 222, and the judging unit 223 form one subcircuit whose object is to judge whether the secret key used by the transmission apparatus 100 is the secret key K1. In the same way, the secret key storage unit 230, the decryption module 231, the decryption module 232, and the judging unit 233 form one subcircuit whose object is to judge whether the secret key used by the transmission apparatus 100 is the secret key K2. Also, the secret key storage unit 240, the decryption module 241, the decryption module 242, and the judging unit 243 form one subcircuit whose object is to judge whether the secret key used by the transmission apparatus 100 is the secret key K3. These three subcircuits are identical in construction and function, with the only difference being in the secret key stored in the secret key storage unit 220, in the secret key storage unit 230, and in the secret key storage unit 240. Accordingly, only one of these subcircuits will be described.

The secret key storage unit 220 can be composed of semiconductor memory that stores the secret key K1.

The decryption module 221 can be composed of an IC for performing decryption based on the secret decryption algorithm D2 that is the inverse transformation of the encryption algorithm E2 of the encryption module 105 in the transmission apparatus 100. This decryption module 221 decrypts the cryptogram Ca sent from the reception unit 211 using the secret key K1 read from the secret key storage unit 220 as the decryption key, and sends the obtained decrypted data M1(=D2(Ca,K1)) to the judging unit 223 and the decryption module 222.

The decryption module 222 can be composed of an IC for performing decryption based on the secret decryption algorithm D3 that is the inverse transformation of the encryption algorithm E3 of the encryption module 107 in the transmission apparatus 100. This decryption module 222 decrypts the cryptogram Cm sent from the reception unit 212 using the decrypted data M1 sent from the decryption module 221 as the decryption key, and sends the obtained decrypted data M11(=D3(Cm,M1)) to the judging unit 223.

The judging unit 223 can be composed of a comparator, and judges whether the decrypted data M1 sent from the decryption module 221 matches the decrypted data M11 sent from the decryption module 222. When the two sets of decrypted data match, the judging unit 223 sends the data "1" to the overall judging unit 203, or otherwise sends the data "0" to the overall judging unit 203.

Here, the case where the two sets of decrypted data match (M1=M11) corresponds to the case where the secret key Ks selected by the transmission apparatus 100 is secret key K1. The reasoning behind this is explained below.

Suppose that the secret key selection unit 104 in the transmission apparatus 100 has selected secret key K1. In such case, $$Ks = K1 \qquad \text{Equation (1)}$$

This means that the following relationships are established.

$$Ca = E2(M, Ks)$$
$$= E2(M, K1) \qquad \text{Equation (2)}$$
$$Cm = E3(M, M) \qquad \text{Equation (3)}$$

As a result, the decrypted data M1 outputted by the decryption module 221 of the reception apparatus 200 can be rearranged using the relation given in Equation (2) above.

$$M1 = D2(Ca, K1)$$
$$= D2(E2(M, K1), K1)$$
$$= M \qquad \text{Equation (4)}$$

On the other hand, the decrypted data M11 outputted by the decryption module 222 of the reception apparatus 200 can be rearranged using the relations given in Equations (3) and (4) above.

$$M11 = D3(Cm, M1)$$
$$= D3(E3(M, M), M)$$
$$= M \qquad \text{Equation (5)}$$

From Equations (4) and (5) above:

$$M1 = M11 \qquad \text{Equation (6)}$$

It should be noted here that the judging unit 233 in the second subcircuit similarly judges whether the decrypted data M2 sent from the decryption module 231 matches the decrypted data M22 sent from the decryption module 232. When the two sets of decrypted data match, the judging unit 233 sends the decrypted data "1" to the overall judging unit 203, or otherwise sends the data "0" to the overall judging unit 203. The judging unit 243 in the third subcircuit similarly judges whether the decrypted data M3 sent from the decryption module 241 matches the decrypted data M33 sent from the decryption module 242. When the two sets of decrypted data match, the judging unit 243 sends the decrypted data "1" to the overall judging unit 203, or otherwise sends the data "0" to the overall judging unit 203.

The overall judging unit 203 can be composed of a logical OR circuit and a selector, and, based on the data sent from the judging unit 223, the judging unit 233, and the judging unit 243, sends a specification ("1", "2", or "3") of the secret key (K1, K2, or K3) which should be used for the decryption of the encrypted digital production Cd sent from the transmission apparatus 100 to the secret key selection unit 202, or otherwise sends an indication ("0") that a decryption key cannot be identified to the secret key selection unit 202.

More specifically, when the output of the judging unit 223 is the data "1" showing that the sets of decrypted data match, the overall judging unit 203 sends an indication "1", showing that secret key K1 is selected, to the secret key selection unit 202, regardless of the outputs of the judging unit 233 and the judging unit 243. When the output of the judging unit 223 is the data "0" and the output of the judging unit 233 is the data "1", the overall judging unit 203 sends an indication "2", showing that secret key K2 is selected, to the secret key selection unit 202. Similarly, when the output of the judging unit 243 is the data "1", the overall judging unit 203 sends an indication "3", showing that secret key K3 is selected, to the secret key selection unit 202. When the data outputted by each of the judging units 223, 233, and 243 is "0" showing that none of the data matches, the overall judging unit 203 sends the indication "0" to the secret key selection unit 202 showing that a decryption key could not be specified.

The secret key selection unit 202 can be composed of a selector, and, depending on whether the output of the overall judging unit 203 is "0", "1", "2", or "3", does not output a secret key to the decryption module 201, outputs the secret key K1 to the decryption module 201, outputs the secret key K2 to the decryption module 201, or outputs the secret key K3 to the decryption module 201. This secret key selection unit 202 maintains its output while the blocks of the encrypted digital production Cd are being repeatedly transmitted from the transmission apparatus 100.

Operation of the Encrypted Communication System

The following is a description of the operation of the encrypted communication system whose construction is described above.

Figure 2:
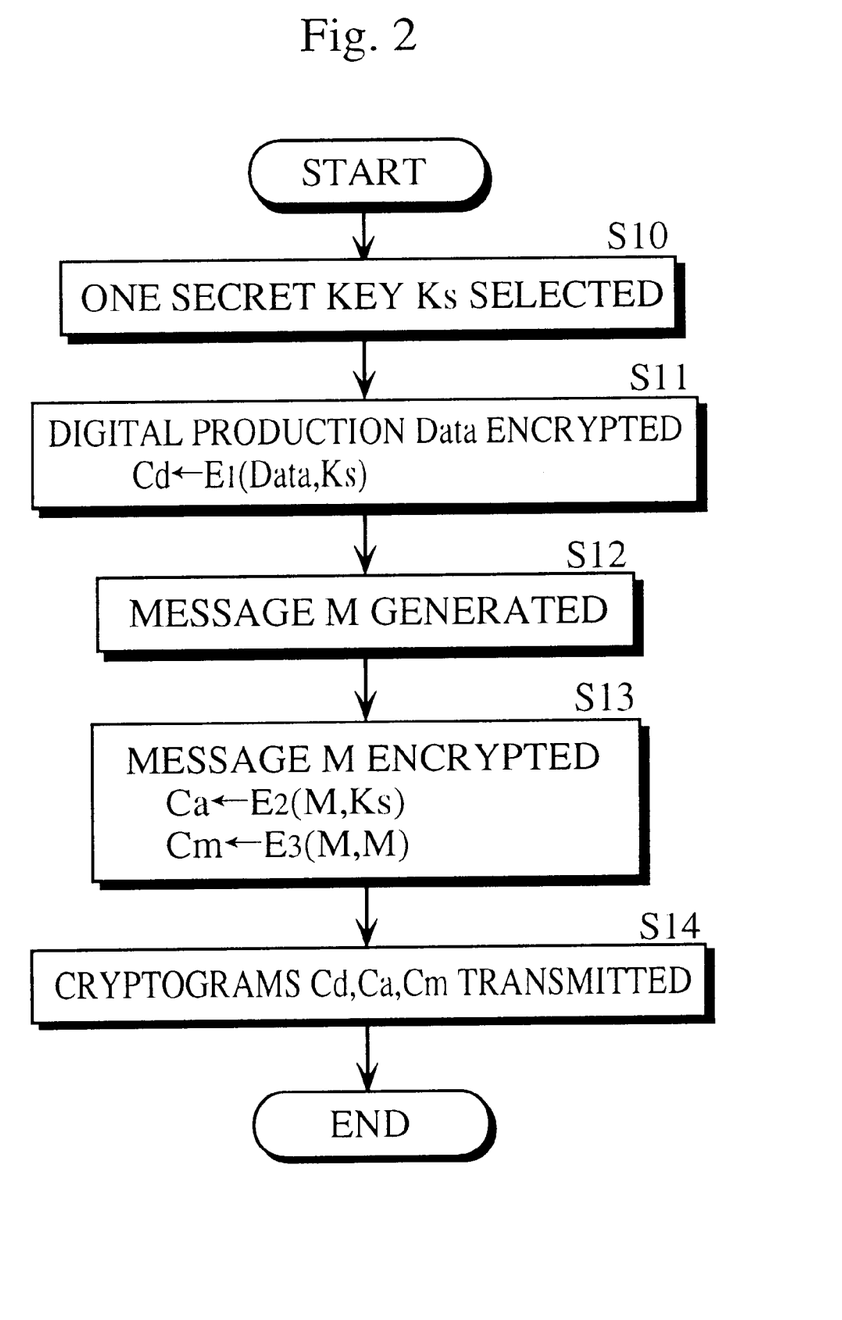
FIG. 2 is a flowchart showing the operation procedure of the transmission apparatus 100 in the present system.

FIG. 2 is a flowchart for the operation of the transmission apparatus 100. First, the secret key selection unit 104 randomly selects one of the three secret keys K1, K2, or K3 stored in the secret key storage unit 103 as the secret key Ks and sends it to the encryption module 102 and the encryption module 105 (step S10).

The encryption module 102 uses the secret key Ks to encrypt the block data "Data" of the digital production 101, thereby generating the cryptogram Cd. The encryption module 102 then sends this to the transmission unit 110 (step S11).

The message generation unit 106 generates one message M (step S12).

The encryption module 105 uses the same secret key Ks to encrypt the message M sent from the message generation unit 106 to generate the cryptogram Ca. The encryption module 102 then sends this to the transmission unit 111. Meanwhile, the encryption module 107 encrypts the message M using the message M itself as the secret key, thereby generating the cryptogram Cm which it sends to the transmission unit 112 (step S13).

Finally, the transmission units 110, 111, and 112 transmit these three cryptograms Cd, Ca, and Cm to the reception apparatus 200 (step S14). It should be noted here that for the remaining blocks of the digital production 101, only the transmission of the cryptogram Cd is repeated, so that the cryptograms Ca and Cm are only transmitted once.

Figure 3:
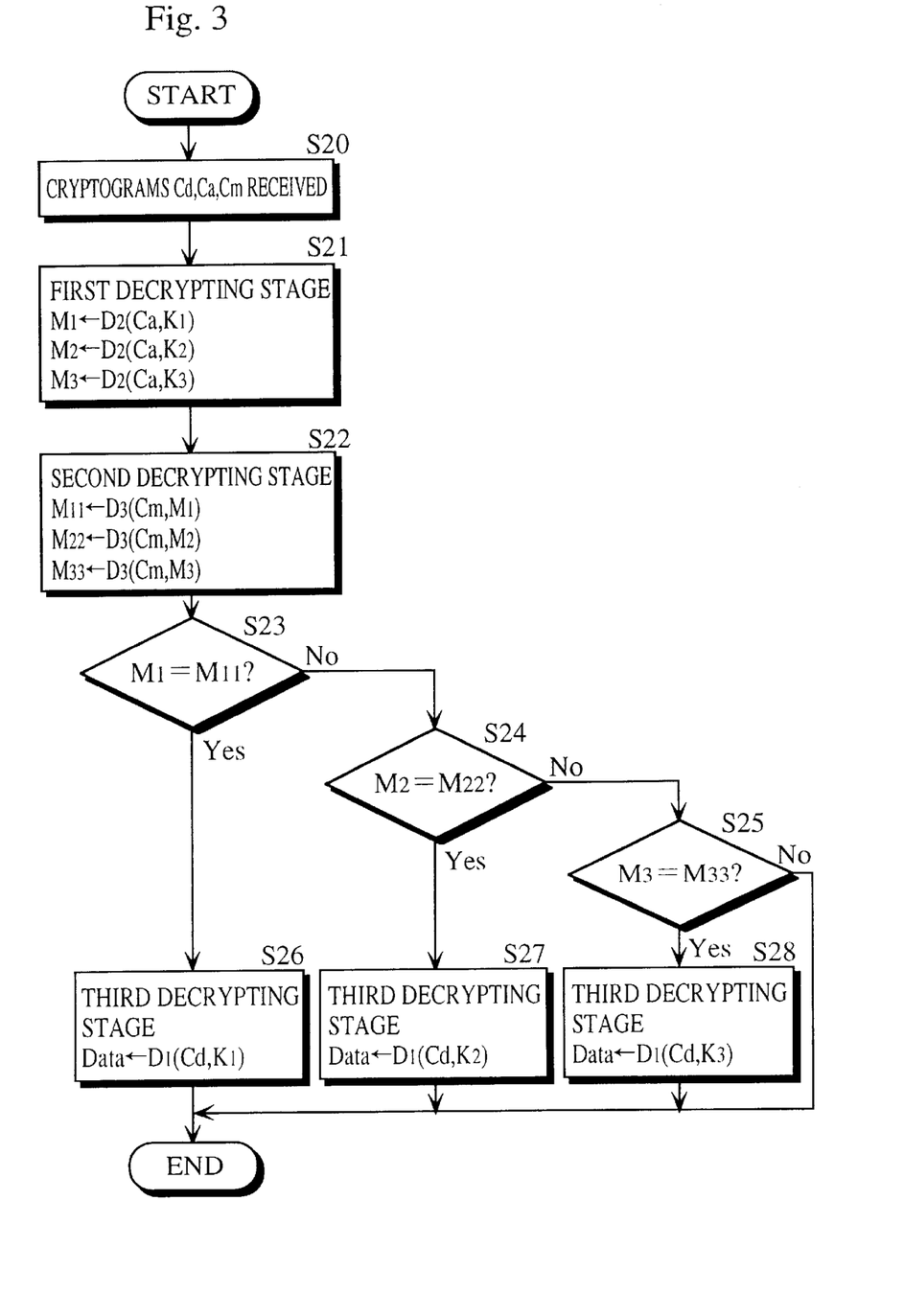
FIG. 3 is a flowchart showing the operation procedure of the reception apparatus 200 in the present system.

FIG. 3 is a flowchart showing the operation of the reception apparatus 200. First, the reception units 210, 211, and 212 receive the three cryptograms Cd, Ca, and Cm transmitted from the transmission apparatus 100 via the three transfer paths 120, 121, and 122, and respectively send the received cryptogram Cd to the decryption module 201, the cryptogram Ca to the decryption module 221, the decryption module 231, and the decryption module 241, and the cryptogram Cm to the decryption module 222, the decryption module 232, and the decryption module 242 (Step S20).

In the first decrypting stage, the decryption module 221 decrypts the cryptogram Ca sent from the reception unit 211 using the secret key K1 read from the secret key storage unit 220 to generate the decrypted data M1 which it sends to the decryption module 222 and the judging unit 223. Simultaneously, the decryption module 231 decrypts the cryptogram Ca sent from the reception unit 211 using the secret key K2 read from the secret key storage unit 230 to generate the decrypted data M2 which it sends to the decryption module 232 and the judging unit 233, and the decryption module 241 decrypts the cryptogram Ca sent from the reception unit 211 using the secret key K3 read from the secret key storage unit 240 to generate the decrypted data M3 which it sends to the decryption module 242 and the judging unit 243 (step S21).

In the second decrypting stage, the decryption module 222 decrypts the cryptogram Cm received from the reception unit 212 using the decrypted data M1 generated by the decryption module 221 as the decryption key to generate the decrypted data M11 which it sends to the judging unit 223, while in parallel the decryption module 232 decrypts the cryptogram Cm received from the reception unit 212 using the decrypted data M2 generated by the decryption module 222 as the decryption key to generate the decrypted data M22 which it sends to the judging unit 223, and the decryption module 242 decrypts the cryptogram Cm received from the reception unit 212 using the decrypted data M3 generated by the decryption module 242 as the decryption key to generate the decrypted data M33 which it sends to the judging unit 243 (step S22).

The judging unit 223 judges whether the decrypted data M1 generated by the decryption module 221 matches the decrypted data M11 generated by the decryption module 222 and, when the data matches, outputs the data "1" to the overall judging unit 203, or otherwise outputs "0" to the overall judging unit 203 (step S23). Concurrently, the judging unit 233 judges whether the decrypted data M2 generated by the decryption module 231 matches the decrypted data M22 generated by the decryption module 232 and, when the data matches, outputs the data "1" to the overall judging unit 203, or otherwise outputs "0" to the overall judging unit 203 (step S24), and the judging unit 243 judges whether the decrypted data M3 generated by the decryption module 241 matches the decrypted data M33 generated by the decryption module 242 and, when the data matches, outputs the data "1" to the overall judging unit 203, or otherwise outputs "0" to the overall judging unit 203 (step S25).

On receiving the data "1" indicating a match from the judging unit 223, the overall judging unit 203 gives this data priority over any data sent from the judging unit 233 or the judging unit 243, and so gives an indication "1" to the secret key selection unit 202 indicating a selection of the secret key K1. As a result, the decryption module 201 uses the secret key K1 sent from the secret key selection unit 202 to decrypt the cryptogram Cd sent from the transmission unit 210 into the original "Data" of the digital production (Step S26).

On the other hand, when the overall judging unit 203 has received the data "0" from the judging unit 223 showing that there has not been a match and the data "1" from the judging unit 233 indicating a match, the overall judging unit 203 gives an indication "2" to the secret key selection unit 202, indicating a selection of the secret key K2. As a result, the decryption module 201 uses the secret key K2 sent from the secret key selection unit 202 to decrypt the cryptogram Cd sent from the transmission unit 210 into the original "Data" of the digital production (Step S27).

On the other hand, when the overall judging unit 203 has received the data "0" from the judging unit 223 and the judging unit 233 showing that there has not been a match and the data "1" from the judging unit 243 indicating a match, the overall judging unit 203 gives an indication "3" to the secret key selection unit 202, indicating a selection of the secret key K3. As a result, the decryption module 201 uses the secret key K3 sent from the secret key selection unit 202 to decrypt the cryptogram Cd sent from the transmission unit 210 into the original "Data" of the digital production (Step S28).

When the judging unit 223, the judging unit 233, and the judging unit 243 send the data "0" showing that there has not been a match, the overall judging unit 203 gives an indication "0" to the secret key selection unit 202. As a result, the decryption module 201 does not decrypt the cryptogram Cd sent from the reception unit 210 (Step S25).

As described above, the present invention has three secret keys distributed to both the transmission apparatus 100 and the reception apparatus 200, with the transmission apparatus 100 using one of the secret keys to encrypt the digital production 101 before transmission to the reception apparatus 200. The reception apparatus 200, meanwhile, will be able to decrypt the encrypted digital production 101 despite not receiving a clear indication of which of the three secret keys has been used as the secret key Ks for encryption. This is possible because the reception apparatus 200 is indirectly informed of which secret key has been selected as the secret key Ks by the two cryptograms Ca and Cm.

The transfer of the secret key described above is possible due to the predetermined rule of the cryptogram Cm, which is to say, cryptogram Cm is the result of encryption of the message M using the message M itself as the encryption key, so that the reception apparatus 200 can use this cryptogram Cm to specify the secret key Ks which was used by the transmission apparatus 100.

With the secret key transfer method of the present embodiment described above, (i) cryptograms, not plaintexts, are transmitted on the transfer paths 121 and 122, (ii) a time-variant random number (message M) is used for such transfer, and (claimant function selection number i) the random number (message M) is encrypted using the random number (message M) itself as the encryption key, so that there is no fixed relationship between secret key Ks selected by the transmission apparatus 100 and the cryptograms Ca and Cm transmitted to the reception apparatus 200. As a result, the system is secure from attack by a third party who intercepts the communication on the transfer paths 120–122.

Second Embodiment

The following is an explanation of the second embodiment of the present invention, with reference to the drawings.

In the same way as the first embodiment, this second embodiment is a secret key encrypted communication system which uses three kinds of cryptograms, Cd, Ca, and Cm, to transfer a secret key and a digital production. The second embodiment differs from the first embodiment in that the transmission apparatus is further equipped with a function for ensuring that the reception apparatus will be able to specify the correct secret key Ks.

Construction of the Transmission Apparatus

Figure 4:
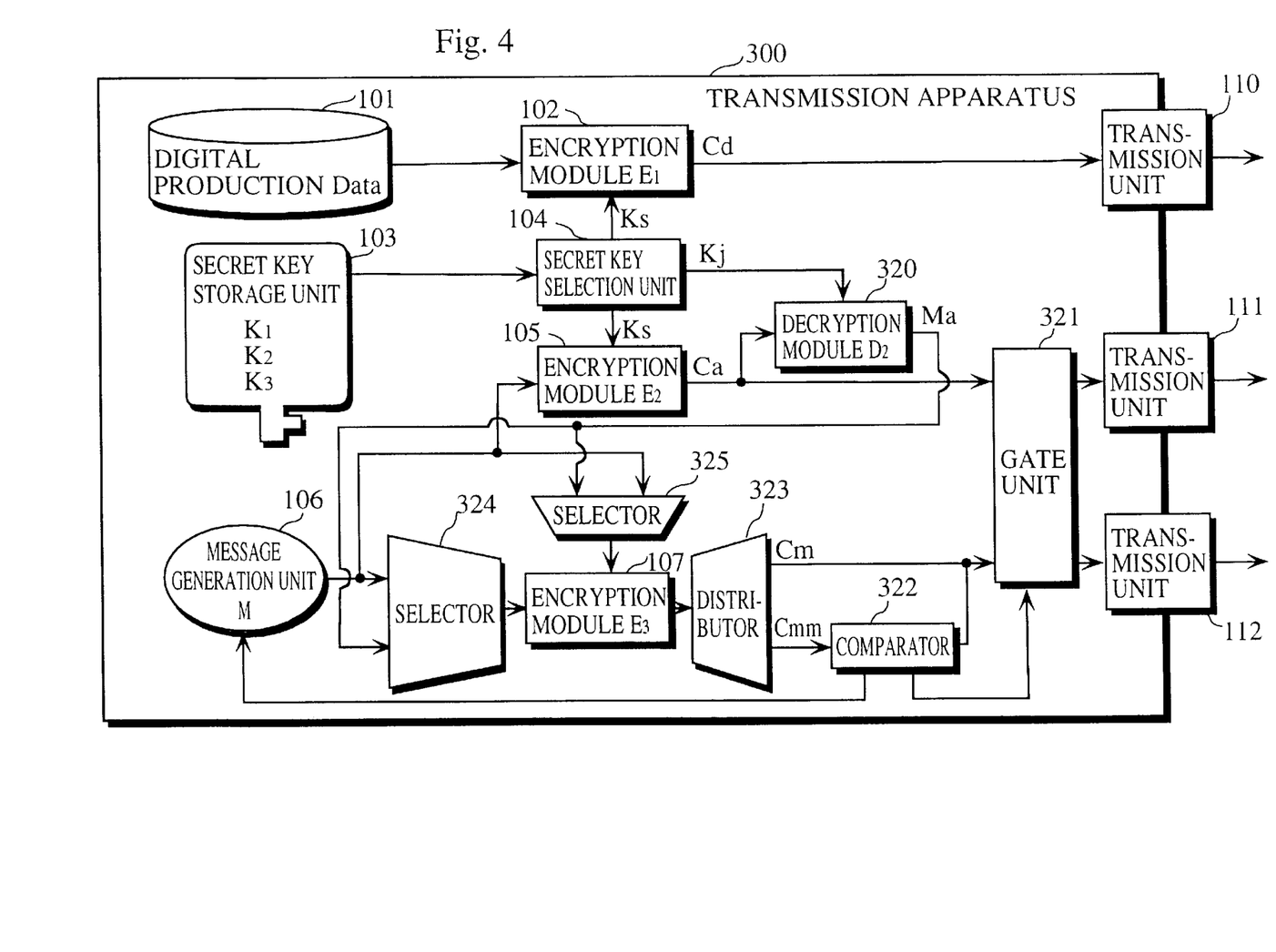
FIG. 4 is a block diagram showing the construction of the transmission apparatus 300 of the encrypted communication system of the second embodiment of the present invention.

FIG. 4 is a block diagram showing the construction of the transmission apparatus 300 of the encrypted communication system of the second embodiment of the present invention. In this second embodiment, the reception apparatus is identical to the reception apparatus 200 described in the first embodiment.

In addition to the components 101–107 and 110–112 of the transmission apparatus 100 in the first embodiment, the transmission apparatus 300 includes a decryption module 320, a gate unit 321, a comparator 322, a distributor 323, and two selectors 324 and 325.

The transmission apparatus 300 of the present embodiment is the same as the transmission apparatus 100 in that the secret key selection unit 104 freely selects and reads one of the secret keys K1, K2, and K3 stored in the secret key storage unit 103 as the secret key Ks used for encrypting the digital production 101, before supplying the secret key Ks to the encryption module 102 and the encryption module 105, but differs in that the remaining two secret keys Kj (j=1,2) are successively read by the secret key selection unit 104 are sent to the decryption module 320.

The decryption module 320 is the same as the decryption module 221 in the first embodiment, which is to say an IC for performing decryption according to the decryption algorithm D2 which is the inverse conversion of the encryption algorithm E2 of the encryption module 105. Every time it receives a secret key Kj from the secret key selection unit 104, the decryption module 320 decrypts the cryptogram Ca generated by the encryption module 105 using the secret key Kj and sends the obtained decrypted data Ma(=D2(Ca,Kj)) to the selectors 324 and 325.

The gate unit 321 can be composed of a latch circuit and stores both the cryptogram Ca generated by the encryption module 105 and the cryptogram Cm generated by the encryption module 107 (this cryptogram Cm having passed through the distributor 323). Based on an indication from the comparator 322, the gate unit 321 discards the stored cryptograms Ca and Cm, or otherwise outputs them to the transmission units 111 and 112.

The selectors 324 and 325 are composed of two input-one output multiplexer circuits which select the cryptogram Ma from the decryption module 320 after selecting the message M from the message generation unit 106.

The distributor 323 is composed of a multiplexer circuit that operates to synchronize the selectors 324 and 325. When the selectors 324 and 325 select the message M, the distributor 323 sends the cryptogram Cm outputted by the encryption module 107 into the gate unit 321 and the first input port of the comparator 322. On the other hand, when the selectors 324 and 325 select the decrypted data Ma, the distributor 323 sends the cryptogram Cmm outputted by the encryption module 107 into the second input port of the comparator 322.

The comparator 322 stores the cryptogram Cm inputted into the first input port and judges whether this cryptogram Cm matches any of the cryptograms Cmm successively inputted into the second input port.

When there is a match, the comparator 322 notifies the gate unit 321 and the message generation unit 106 of the match to have the message generation unit 106 generate a new message M and the gate unit 321 discard the two cryptograms Ca and Cm which it is holding and to instead hold new cryptograms Ca and Cm.

On the other hand, when none of the cryptograms Cmm inputted into the second input port matches the cryptogram Cm, the comparator 322 informs the gate unit 321 that there has not been a match, thereby allowing the gate unit 321 to transfer the held cryptograms Ca and Cm to the transmission units 111 and 112.

With the operation described above, the low probability that a mistaken judgement is made by one of the three judging units 223, 233, and 243 of the reception apparatus 200, which is to say, the risk that erroneous decryption will be performed using a decryption key Kj that differs from the secret key Ks selected by the secret key selection unit 104 of the transmission apparatus 300, can be avoided. This could be caused when the two sets of decrypted data Mj(=D2(Ca,Kj)) and Mjj(=D3(Cm,Mj)) inputted into one of the judging units 223–243 also match.

The above operation can prevent cases where, for example, even though the transmission apparatus 300 has used the secret key K2 to encrypt the digital production 101 and the message M, in the reception apparatus 200, the decrypted data M1 generated by the decryption module 221 and the decrypted data M11 generated by the decryption module 222 still end up matching.

The reason that there is a slight probability of the error described above occurring in the secret key transfer method of the first embodiment is described below.

When, in the first embodiment, the transmission apparatus 100 selects the secret key K2, uses it to perform encryption, and sends the three cryptograms Cd, Ca, and Cm to the reception apparatus 200. In the reception apparatus 200, the decrypted data M1 generated by the decryption module 221 and the decrypted data M11 generated by the decryption module 222 are generated using a secret key K1 that differs from the secret key K2 used by the transmission apparatus 100, so that it can be ensured that neither of the sets of decrypted data M1 and M11 will match the original message M.

However, the above premise does not exclude the possibility that M1 will still match M11, which is to say, the possibility that decrypted data M1 and M11 match each other (M1=M11), despite differing from the original message (M1≠M and M11≠M).

This is explained from a different angle below.

Suppose that the encryption modules 105 and 107 for transferring the secret key each receive a plaintext of L bits and use an encryption key of L bits to generate a cryptogram also of L bits.

Here, for the encryption module 105, the L bits of the encryption key are fixed (according to a secret key such as K2), with a one-to-one mapping relation of L bits to L bits being established between the plaintext and the cryptogram. Accordingly, a complete decryption of all L bits of the cryptogram is possible.

However, the encryption performed by the encryption module 107 is of a special nature in that the plaintext and encryption key are related to one another, so that while the plaintext and the cryptogram may both be of L bits, changes in the L bits of the plaintext also result in changes in the L bits of the encryption key. Accordingly, it cannot be ensured that a one-to-one mapping relation of L bits to L bits is established between the plaintext and the cryptogram or that a complete decryption of all L bits of the cryptogram is possible.

This means that the number of different cryptograms generated for a number 2 to the power L types of plaintext will be less than 2 to the power L, so that there is the possibility that there will be two or more plaintexts which result in the same cryptogram.

For this reason, the reception apparatus 200 of the at first embodiment suffers from the risk that the decrypted data Mj obtained by decrypting the cryptogram Ca and the decrypted data Mjj obtained by decrypting the cryptogram Cm will match, even though these sets of decrypted data Mj and Mjj do not match the original message M, causing the problems described earlier.

In the present embodiment, the construction including the decryption module 320, the comparator 322, and the gate unit 321 in the transmission apparatus 300 prevents combinations of cryptograms Ca and Cm that could cause the problems described above being transmitted to the reception apparatus 200.

Operation of the Transmission Apparatus

Figure 5:
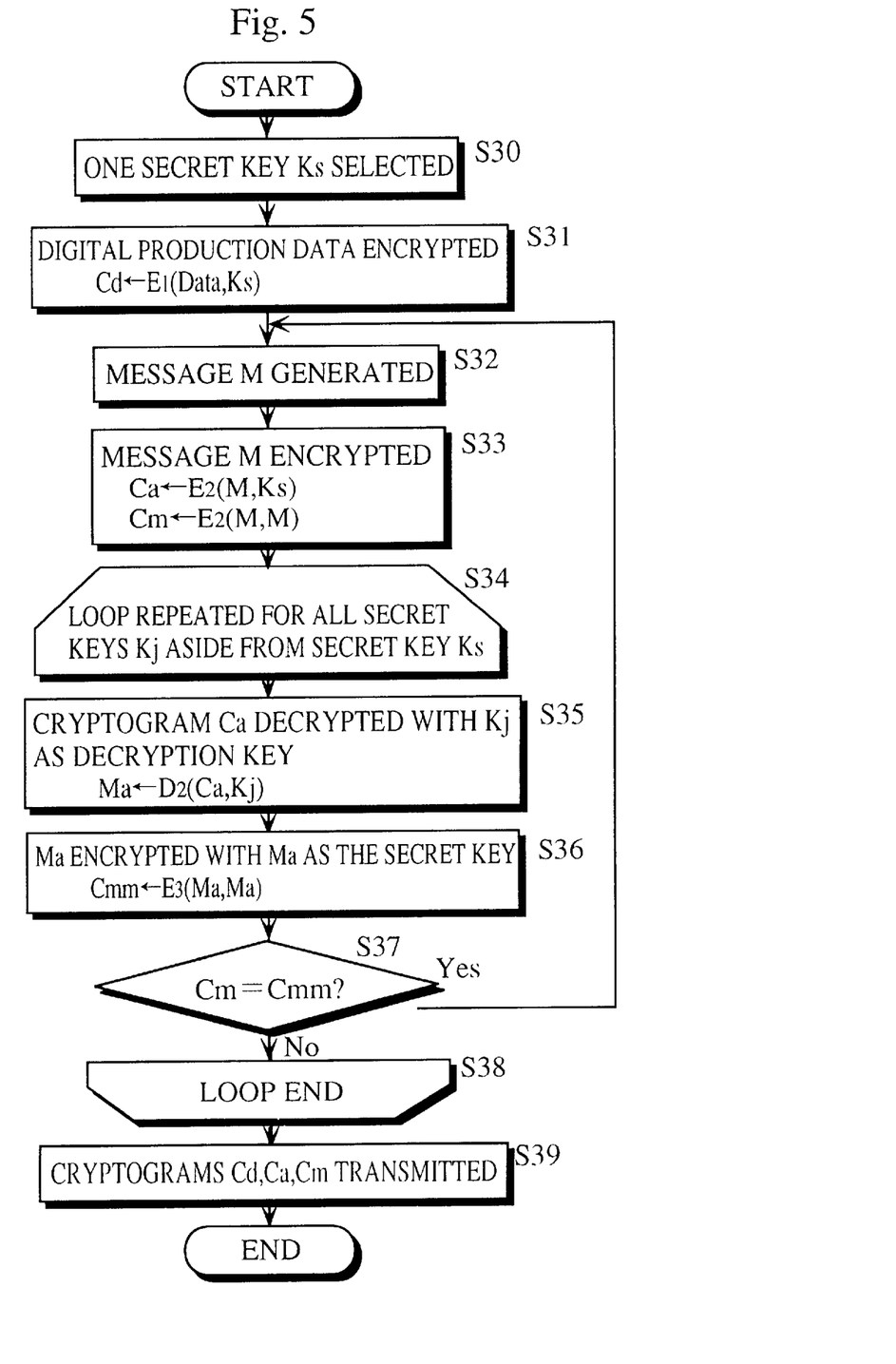
FIG. 5 is a flowchart showing the operation procedure of the transmission apparatus 300.

FIG. 5 is a flowchart showing the operation procedure of the transmission apparatus 300 in the encrypted communication system of the second embodiment.

In FIG. 5, steps S30–S33 and step S39 are the same as steps S10–S13 and S14 in the flowchart of FIG. 2 for the first embodiment. However, in S33, the cryptogram Ca generated by the encryption module 105 is held by the gate unit 321 and the cryptogram generated by the encryption module 107 is held by the gate unit 321 and the comparator 322 via the distributor 323.

After completing the selection of the secret key Ks and the generation of the three cryptograms Cd, Ca, and Cm (steps S30–S33), a fixed loop process (steps S34–S38) is performed before transmitting the cryptograms Cd, Ca, and Cm. This loop process judges whether the current cryptograms Ca and Cm are suitable for transferring the secret key, with the new cryptograms Ca and Cm being generated when the current cryptograms Ca and Cm are deemed unsuitable.

In more detail, the secret key selection unit 104 reads one secret key Kj which is not the secret key Ks from the secret key storage unit 103 and sends it to the decryption module 320, with the following processes (steps S35–S37) being repeated (steps S34–S38).

First, the decryption module 320 uses the secret key Kj sent from the secret key selection unit 104 as a decryption key to decrypt the cryptogram Ca generated in step S33 and sends the obtained decrypted data Ma to the selectors 324 and 325 (step S35).

The selectors 324 and 325 select the received decrypted data Ma and let it pass through. As a result, the encryption module 107 encrypts the decrypted data Ma using the decrypted data Ma itself as the decryption key, and outputs the resulting cryptogram Cmm (=E2(Ma,Ma)) to the distributor 323. The distributor 323 then allows this cryptogram Cmm to pass through to the second input port of the comparator 322 (step S36).

The comparator 322 judges whether the cryptogram Cm, which is already stored having been inputted via the first input port in step S33, matches the cryptogram Cmm inputted via the second input port (step S37).

When the cryptograms do not match, the same process is repeated for the next secret key Kj (steps S35–S37).

When none of the comparisons performed by the comparator 322 for all of the secret keys Kj aside from the secret key Ks selected in step S30 results in a match, the cryptograms Ca and Cm generated in step S33 are confirmed as suitable cryptograms, the loop process is ended, and the transmission units 110, 111, and 112 transmit the cryptogram Cd generated by the encryption module 102 and the cryptograms Ca and Cm held by the gate unit 321 to the reception apparatus 200 (step S39).

On the other hand, if the comparator 322 finds that the cryptograms match in step S37, which corresponds to the case when the two cryptograms Ca and Cm generated in step S33 have been found to be unsuitable, the loop processing is canceled and the processing is repeated starting from the generation of the message M (steps S32–S36). As a result, the comparator 322 has the gate unit 321 discard the present cryptograms Ca and Cm and has the message generation unit 106 generate a new message M (Step S32). This message M is then used in encryption to generate new cryptograms Ca and Cm (step S33), and the processing to investigate whether these are suitable cryptograms is performed (steps S34–S37)

By doing so, the transmission apparatus 300 is able to eliminate the problems which can occur in a reception apparatus 200 that has received the cryptograms Ca and Cm from the transmission apparatus 300 when the decrypted data Mj obtained by decrypting the cryptogram Ca matches the decrypted data Mjj obtained by decrypting the cryptogram Cm, even though the reception apparatus 200 has used a secret key Kj that differs from the secret key Ks used by the transmission apparatus 300.

Third Embodiment

The following is an explanation of the third embodiment of the present invention, with reference to the drawings.

In the same way as the first embodiment, this third embodiment is a secret key encrypted communication system which uses three kinds of cryptograms, Cd, Ca, and Cm, to transfer a secret key and a digital production. The third embodiment resembles the second embodiment in that the transmission apparatus is further equipped with a function for ensuring that an unsuitable combination of cryptograms Ca and Cm is not transmitted to reception apparatus, but differs from the second embodiment in the method used to achieve this.

Construction of the Transmission Apparatus

Figure 6:
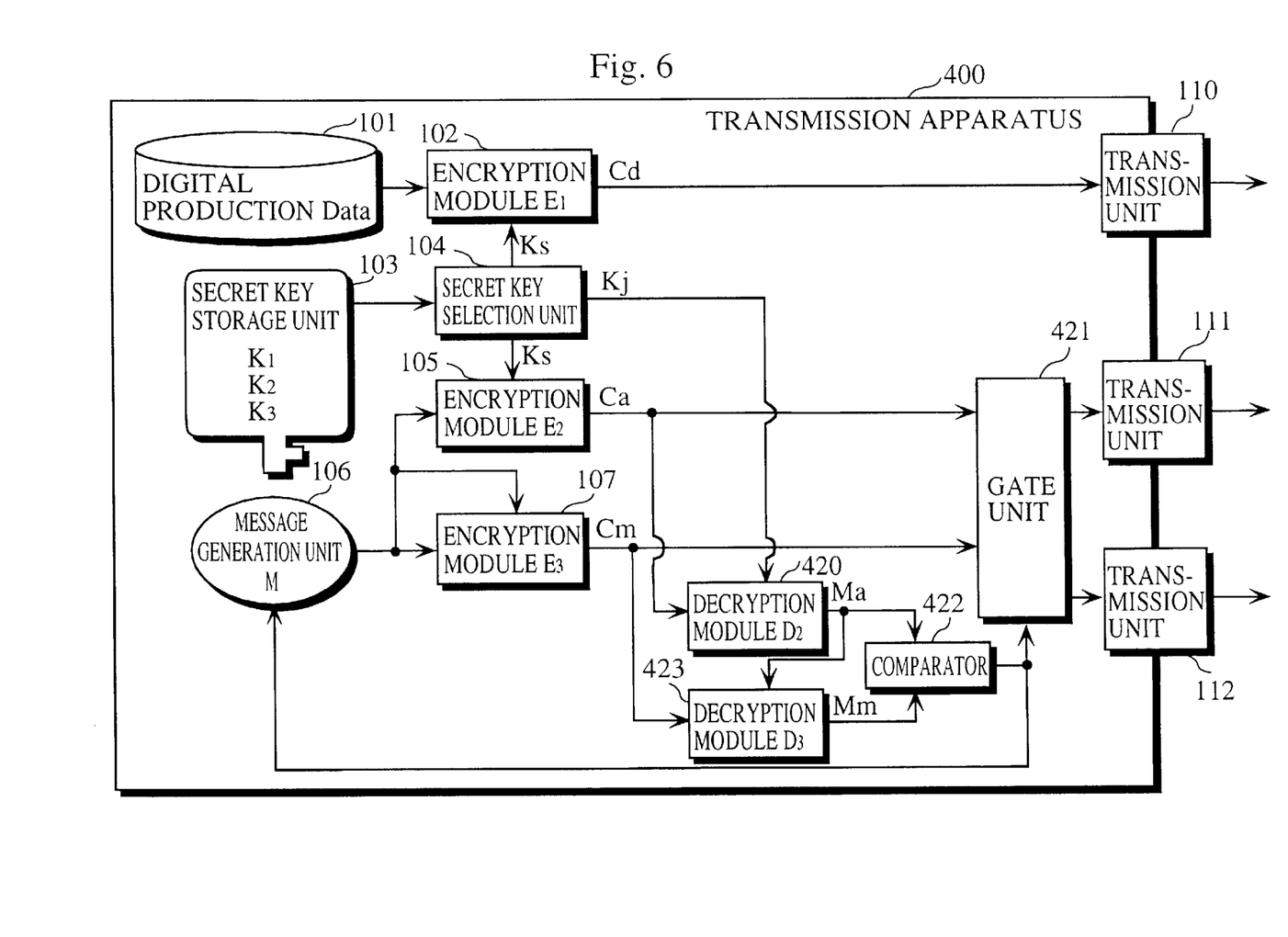
FIG. 6 is a block diagram showing the construction of the transmission apparatus 400 of the encrypted communication system of the third embodiment of the present invention.

FIG. 6 is a block diagram showing the construction of the transmission apparatus 400 of the encrypted communication system of the third embodiment of the present invention. In this third embodiment, the reception apparatus is identical to the reception apparatus 200 described in the first embodiment.

In addition to the components 101–107 and 110–112 of the transmission apparatus 100 in the first embodiment, the transmission apparatus 400 includes two decryption modules 420 and 423, a gate unit 421, and a comparator 422.

The decryption module 420 and the gate unit 421 have the same functions as the decryption module 320 and the gate unit 321 of the transmission apparatus 300 of the second embodiment shown in FIG. 4. The decryption module 420, the decryption module 423 and the comparator 422 also have the same functions as the decryption module 221, the decryption module 221 and the judging unit 223 of the reception apparatus 200 in the first embodiment.

The decryption module 420 can be composed of an IC which performs decryption according to a secret decryption algorithm D2 that is the inverse transformation of the encryption algorithm E2 of the encryption module 105. This decryption module 420 repeatedly decodes the cryptogram Ca generated by the encryption module 105 using each of the secret keys Kj that are successively provided from the secret key storage unit 103 as the decryption key, and transmits the obtained decrypted data Ma(=D2(Ca,Kj)) to the first input port of the comparator 422 and to the decryption module 423.

The decryption module 423 can be composed of an IC which performs decryption according to a secret decryption algorithm D3 that is the inverse transformation of the encryption algorithm E3 of the encryption module 107. This decryption module 423 repeatedly decodes the cryptogram Cm generated by the encryption module 107 using the decrypted data Ma sent from the decryption module 420 as the decryption key, and transmits the obtained decrypted data Mm(=D3(Cm,Ma)) to the second input port of the comparator 422.

The comparator 422 can be composed of a standard comparator, and judges, for each secret key Kj sent to the decryption module 420 by the secret key selection unit 104, whether the decrypted data Mm sent from the decryption module 423 matches the decrypted data Ma sent from the decryption module 420.

On finding that the sets of decrypted data match, the comparator 422 sends notification of the match to the message generation unit 106 and to the gate unit 421 to make the message generation unit 106 generate a new message M and to have the gate unit 421 discard the cryptograms Ca and Cm which it is presently holding and instead hold the newly generated cryptograms Ca and Cm.

On the other hand, when the sets of decrypted data Ma and Mm do not match for any of the secret keys sent to the decryption module 420 by the secret key selection unit 104, the comparator 422 sends notification of such to the gate unit 421 to have the gate unit 421 transmit the presently held cryptograms Ca and Cm to the transmission units 111 and 112.

The gate unit 421 can be composed of a latch circuit, and is used to hold the cryptogram Ca generated by the encryption module 105 and the cryptogram Cm generated by the encryption module 107. The gate unit 421 discards these cryptograms or outputs them to the transmission units 111 and 112 in accordance with the notification received from the comparator 422.

Operation of the Transmission Apparatus

Figure 7:
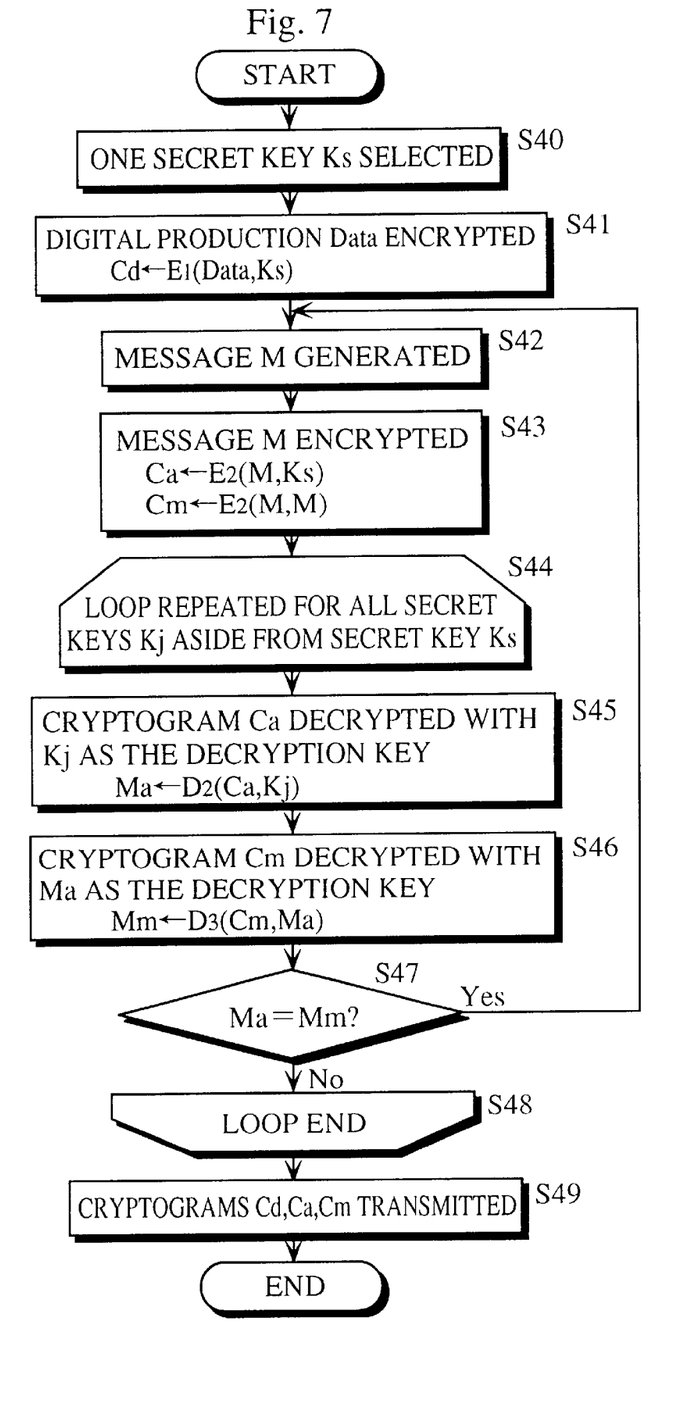
FIG. 7 is a flowchart showing the operation procedure of the transmission apparatus 400.

FIG. 7 is a flowchart showing the operation procedure of the transmission apparatus 400 in the encrypted communication system of the third embodiment.

This flowchart is largely the same as the flowchart shown in FIG. 5 for the second embodiment, although different evidence is used to judge whether the cryptograms Ca and Cm are appropriate.

In the second embodiment, the decrypted data Ma obtained by the decryption module 320 is encrypted using itself as the encryption key (step S36 in FIG. 5) and the two cryptograms Cm and Cmm are compared (step S37 in FIG. 5), while in the present embodiment, the decrypted data Ma obtained by the decryption module 420 is used as the decryption key to decrypt the cryptogram Cm (step S46 in FIG. 7) and the two sets of decrypted data Ma and Mm are compared (step S47 in FIG. 7).

As in the second embodiment, the transmission apparatus 400 of the third embodiment eliminates the problems which can occur in a reception apparatus 200 that has received the cryptograms Ca and Cm from the transmission apparatus 400 when the decrypted data Mj obtained by decrypting the cryptogram Ca matches the decrypted data Mjj obtained by decrypting the cryptogram Cm, even though the reception apparatus 200 has used a secret key Kj that differs from the secret key Ks used by the transmission apparatus 400.

This transmission apparatus 400 of the present embodiment can be said to have replaced the distributor 323 and the selectors 324 and 325 required by the transmission apparatus 300 of the second embodiment with one decryption module 423.

The secret key management method of the present invention has been described by means of the first to third embodiments given above, although it should be obvious that the technical scope of the invention is not limited to these embodiments. Accordingly, a number of modifications are possible, such as those given below.

(1) The transfer medium for the secret key management method of the first to third embodiments was described as the cables of the transfer paths 120–122, although a recording medium such as a DVD (Digital Video/Versatile Disc) may be used. In such case, the transmission apparatuses 100, 300, and 400 represent a DVD recording drive while the reception apparatus 200 represents a DVD reproduction drive.

In this secret key management technique, the secret key does not have to be transferred in real time via the transfer path, so that it is also possible for a secret key to be transferred offline via a recording medium.

(2) In the first to third embodiments, the message M generated by the message generation unit 106 is described as a random number that is only used as a carrier for transferring a secret key Ks. In the present invention, however, it is also possible for the message M to be a specific message which the transmission apparatus wishes to send to the reception apparatus. This is possible since the present invention is a technique for transferring a message and a secret key in a concealed state from a transmission apparatus to a reception apparatus.

(3) In the first to third embodiments, three different encryption algorithms were used, although a single encryption algorithm may be used instead. It is also possible for the plurality of secret key storage units and plurality of encryption modules or decryption modules to be realized using a circuit formed on a single semiconductor IC.

As one example, the three subcircuits of the reception apparatus 200 shown in FIG. 1 may be integrated into a single subcircuit. Such construction can be composed of a repetition control circuit for having the three secret keys K1, K2, and K3 successively read and the following decryption and judgement performed for each, a first decryption module for decrypting the cryptogram Ca according to decryption algorithm D2 using the read secret key Ki as the decryption key to generate the decrypted data Mi(=D2(Ca,Ki)), a second decryption module for decrypting the cryptogram Cm according to decryption algorithm D3 using the decrypted data Mi as the decryption key to generate the decrypted data Mii(=D3(Cm,Mi)), and a judging unit for judging whether these sets of decrypted data Mi and Mii match.

(4) The first to third embodiments describe an encrypted communication system that is composed of one transmission apparatus and one reception apparatus, although it is also possible for the system to be composed of one transmission apparatus and a plurality of reception apparatuses.

(5) The first to third embodiments describe a case where the secret key selection unit 104 freely selects the secret key, although the present invention is not limited to this selection method so that the secret key selection unit 104 may select a secret key in accordance with priority rankings that are established beforehand. Here, if a highly ranked secret key is leaked or decoded, the secret key selection unit 104 can be set to select a different key.

(6) In the first to third embodiments, three secret keys are distributed beforehand to the transmission apparatus and the reception apparatus, with only one of these being selected and used in encryption, although this does not need to be the case for the present invention. As one example, each apparatus may be provided with ten secret keys and a combination (such as the result of a logical XOR taken for each bit position) of two secret keys selected out of the ten secret keys may be used as the secret key Ks, with all other combinations of two secret keys selected from the ten secret keys being successively used in the above embodiments as the secret key Kj.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A secret key transfer technique, used in an encrypted communication system composed of a transmission apparatus and a reception apparatus which perform encrypted communication using one secret key selected out of a plurality of secret keys, whereby the transmission apparatus informs the reception apparatus of the selected secret key, the transmission apparatus comprising:
first secret key storing means for storing the plurality of secret keys;
secret key selecting means for selecting one secret key out of the plurality of secret keys stored in the first secret key storing means;
message generating means for generating a message;
first encrypting means for encrypting the message according to a first encryption algorithm using the secret key selected by the secret key selecting means as an encryption key to produce a first cryptogram;
second encrypting means for encrypting the message according to a second encryption algorithm using the message as an encryption key to produce a second cryptogram; and
transferring means for transferring the first cryptogram and the second cryptogram to the reception apparatus, and the reception apparatus comprising:
second secret key storing means for storing the plurality of secret keys;
reception means for receiving the first cryptogram and the second cryptogram transferred from the transmission apparatus;
first decrypting means for decrypting the received first cryptogram according to a first decryption algorithm using one secret key selected from the plurality of secret keys as a decryption key to produce a first set of decrypted data, wherein the first decryption algorithm is an inverse transformation of the first encryption algorithm;
second decrypting means for decrypting the received second cryptogram according to a second decryption algorithm using the first set of decrypted data as a decryption key to produce a second set of decrypted data, wherein the second decryption algorithm is an inverse transformation of the second encryption algorithm;
judging means for judging whether the first set of decrypted data matches the second set of decrypted data and, when the sets of decrypted data match, for authorizing that the secret key used by the first decryption means is the secret key selected by the transmission apparatus; and
repetition control means for having a decryption by the first decrypting means, a decryption by the second decrypting means, and a judgement and an authorization by the judging means repeated for each of the plurality of secret keys in the second secret key storage means in order.

2. The secret key transfer technique of claim 1,
wherein the transmission apparatus further comprises:
cryptogram suitability confirming means for confirming that the first cryptogram and the second cryptogram are suitable cryptograms which ensure that the authorization of the judging means in the reception apparatus is performed correctly, for allowing the transferring means to transfer the first cryptogram and the second cryptogram to the reception apparatus when the first cryptogram and the second cryptogram are confirmed as suitable, and for having the message generating means generate a new message, the first encrypting means repeat encrypting and the second encrypting means repeat encrypting when the first cryptogram and the second cryptogram are not confirmed as suitable.

3. The secret key transfer technique of claim 2, wherein the cryptogram suitability confirming means includes:

third decrypting means for successively reading one secret key at a time, aside from the secret key selected by the secret key selecting means, from the plurality of secret keys stored in the first secret key storing means and using the read secret key as a decryption key to decrypt the first cryptogram according to the first decryption algorithm to produce a third set of decrypted data;

first encrypting control means for controlling the second encrypting means to generate a third cryptogram by encrypting the third set of decrypted data according to the second encryption algorithm using the third set of decrypted data as an encryption key; and comparing means for comparing the second cryptogram with a third cryptogram generated by the third decrypting means based on each read secret key, for judging that the first cryptogram and the second cryptogram are suitable when none of the third cryptograms matches the second cryptogram, and for judging that the first cryptogram and the second cryptogram are not suitable when at least one of the third cryptograms matches the second cryptogram.

4. The secret key transfer technique of claim 3, wherein the transmission apparatus further comprises:

transfer data storing means for storing transfer data that is to be transferred to the reception apparatus; and third encrypting means for encrypting the transfer data stored in the transfer data storing means according to a third encryption algorithm using the secret key selected by the secret key selecting means as an encryption key to produce a fourth cryptogram;

wherein the transferring means transfers the fourth cryptogram together with the first cryptogram and second cryptogram to the reception apparatus, wherein the reception means of the reception apparatus receives the fourth cryptogram together with the first cryptogram and second cryptogram, and wherein the reception apparatus further comprises:

fourth decrypting means for decrypting the fourth cryptogram according to a third decryption algorithm using the secret key authorized by the judging means to restore the transfer data, wherein the third decryption algorithm is an inverse transformation of the third encryption algorithm.

5. The secret key transfer technique of claim 2, wherein the cryptogram suitability confirming means includes:

third decrypting means for successively reading one secret key at a time, aside from the secret key selected by the secret key selecting means, from the plurality of secret keys stored in the first secret key storing means and using the read secret key as a decryption key to decrypt the first cryptogram according to the first decryption algorithm to produce a third set of decrypted data;

fourth decrypting means for decrypting the second cryptogram according to the second decryption algorithm using the third set of decrypted data as a decryption key to produce a fourth set of decrypted data; and comparing means for comparing the third set of decrypted data and the fourth set of decrypted data, for judging that the first cryptogram and the second cryptogram are suitable when the third set of decrypted data does not match the fourth set of decrypted data for any of the read secret keys, and for judging that the first cryptogram and the second cryptogram are not suitable when the third set of decrypted data matches the fourth set of decrypted data for at least one of the read secret keys.

6. The secret key transfer technique of claim 5, wherein the transmission apparatus further comprises:

transfer data storing means for storing transfer data that is to be transferred to the reception apparatus; and third encrypting means for encrypting the transfer data stored in the transfer data storing means according to a third encryption algorithm using the secret key selected by the secret key selecting means as an encryption key to produce a third cryptogram;

wherein the transferring means transfers the third cryptogram together with the first cryptogram and second cryptogram to the reception apparatus, wherein the reception means of the reception apparatus receives the third cryptogram together with the first cryptogram and second cryptogram, and wherein the reception apparatus further comprises:

fifth decrypting means for decrypting the third cryptogram according to a fifth decryption algorithm using the secret key authorized by the judging means to restore the transfer data, wherein the fifth decryption algorithm is an inverse transformation of the third encryption algorithm.

7. A transmission apparatus for use in an encrypted communication system composed of a transmission apparatus and a reception apparatus which perform encrypted communication using one secret key selected out of a plurality of secret keys, with the transmission apparatus informing the reception apparatus of the selected secret key, the transmission apparatus comprising:

secret key storing means for storing the plurality of secret keys;

secret key selecting means for selecting one secret key out of the plurality of secret keys that are stored in the secret key storing means;

message generating means for generating a message;

first encrypting means for encrypting the message according to a first encryption algorithm using the secret key selected by the secret key selecting means as an encryption key to produce a first cryptogram;

second encrypting means for encrypting the message according to a second encryption algorithm using the message as an encryption key to produce a second cryptogram; and transferring means for transferring the first cryptogram and the second cryptogram to the reception apparatus.

8. The transmission apparatus of claim 7, wherein the transmission apparatus further comprises:

cryptogram suitability confirming means for confirming that the first cryptogram and the second cryptogram are suitable cryptograms which ensure that an authorization in the reception apparatus is performed correctly, for allowing the transferring means to transfer the first cryptogram and the second cryptogram to the reception apparatus when the first cryptogram and the second cryptogram are confirmed as suitable, and for having the message generating means generate a new message, the first encrypting means repeat encrypting and the second encrypting means repeat encrypting when the first cryptogram and the second cryptogram are not confirmed as suitable.

9. The transmission apparatus of claim 8, wherein the cryptogram suitability confirming means includes:

first decrypting means for successively reading one secret key at a time, aside from the secret key selected by the secret key selecting means, from the plurality of secret keys stored in the secret key storing means and using the read secret key as a decryption key to decrypt the first cryptogram according to a first decryption algorithm to produce a first set of decrypted data, wherein the first decryption algorithm is an inverse transformation of the first encryption algorithm;

a first encrypting control means for controlling the second encrypting means to generate a third cryptogram by encrypting the third set of decrypted data according to the second encryption algorithm using the third set of decrypted data as an encryption key; and a comparing means for comparing the second cryptogram with a third cryptogram generated based on each read secret key, for judging that the first cryptogram and the second cryptogram are suitable when none of the third cryptograms matches the second cryptogram, and for judging that the first cryptogram and the second cryptogram are not suitable when at least one of the third cryptograms matches the second cryptogram.

10. The transmission apparatus of claim 9, further comprising:

transfer data storing means for storing transfer data that is to be transferred to the reception apparatus; and third encrypting means for encrypting the transfer data stored in the transfer data storing means according to a third encryption algorithm using the secret key selected by the secret key selecting means as an encryption key to produce a fourth cryptogram;

wherein the transferring means transfers the fourth cryptogram together with the first cryptogram and second cryptogram to the reception apparatus.

11. The transmission apparatus of claim 8, wherein the cryptogram suitability confirming means includes:

first decrypting means for successively reading one secret key at a time, aside from the secret key selected by the secret key selecting means, from the plurality of secret keys stored in the secret key storing means and using the read secret key as a decryption key to decrypt the first cryptogram according to a first decryption algorithm to produce a first set of decrypted data, wherein the first decryption algorithm is an inverse transformation of the first encryption algorithm;

second decrypting means for decrypting the second cryptogram according to a second decryption algorithm using the first set of decrypted data as a decryption key to produce a second set of decrypted data, wherein the second decryption algorithm is an inverse transformation of the second encryption algorithm; and comparing means for comparing the first set of decrypted data and the second set of decrypted data, for for judging that the first cryptogram and the second cryptogram are suitable when the first cryptogram does not match the second cryptogram for any of the read secret keys, and for judging that the first cryptogram and the second cryptogram are not suitable when the first cryptogram matches the second cryptogram for at least one of the read secret keys.

12. The transmission apparatus of claim 11, further comprising:

transfer data storing means for storing transfer data that is to be transferred to the reception apparatus; and third encrypting means for encrypting the transfer data stored in the transfer data storing means according to a third encryption algorithm using the secret key selected by the secret key selecting means as an encryption key to produce a third cryptogram;

wherein the transferring means transfers the third cryptogram together with the first cryptogram and second cryptogram to the reception apparatus.

13. A reception apparatus for use in an encrypted communication system composed of a transmission apparatus and a reception apparatus which perform encrypted communication using one secret key selected out of a plurality of secret keys, the reception apparatus receiving a first cryptogram and a second cryptogram from the transmission apparatus to indicate the selected secret key, the reception apparatus comprising:

secret key storing means for storing the plurality of secret keys;

reception means for receiving the first cryptogram and the second cryptogram transferred from the transmission apparatus;

first decrypting means for decrypting the received first cryptogram according to a first decryption algorithm using one secret key selected from the plurality of secret keys as a decryption key to produce a first set of decrypted data, wherein the first decryption algorithm is an inverse transformation of a first encryption algorithm that was used to encrypt the first cryptogram;

second decrypting means for decrypting the received second cryptogram according to a second decryption algorithm using the first set of decrypted data as a decryption key to produce a second set of decrypted data, wherein the second decryption algorithm is an inverse transformation of a second encryption algorithm that was used to encrypt the second cryptogram;

judging means for judging whether the first set of decrypted data matches the second set of decrypted data and, when the sets of decrypted data match, for authorizing that the secret key used by the first decryption means is a secret key selected by the transmission apparatus; and repetition control means for having a decryption by the first decrypting means, a decryption by the second decrypting means, and a judging and an authorizing by the judging means repeated for each of the plurality of secret keys in the secret key storage means in order.

14. The reception apparatus of claim 13, wherein the reception means receives a third cryptogram together with the first cryptogram and second cryptogram, the third cryptogram having been generated by the transmission apparatus encrypting transfer data according to a third encryption algorithm using the selected secret key as an encryption key, the reception apparatus further comprising:

third decrypting means for decrypting the third cryptogram according to a third decryption algorithm using the secret key authorized by the judging means to restore the transfer data, wherein the third decryption algorithm is an inverse transformation of the third encryption algorithm.

\* \* \* \* \*

UNITED STATES PATENT AND TRADEMARK OFFICE
CERTIFICATE OF CORRECTION

PATENT NO. : 6,009,174
DATED : December 28, 1999
INVENTOR(S) : Makoto Tatebayashi, et. al.

It is certified that error appears in the above-indentified patent and that said Letters Patent is hereby corrected as shown below:

Title page, item [73] Assignee: add -- Kabushiki Kaisha Toshiba, Kanagawa-Ken, Japan- -

Signed and Sealed this

Thirteenth Day of March, 2001

Attest:

NICHOLAS P. GODICI

Attesting Officer      Acting Director of the United States Patent and Trademark Office